F. J. BORIE.
MACHINE FOR FEEDING WORK INTO AND OUT OF WELDING FURNACES.
APPLICATION FILED DEC. 4, 1918.
1,372,594.
Patented Mar. 22, 1921.
3 SHEETS—SHEET 1.
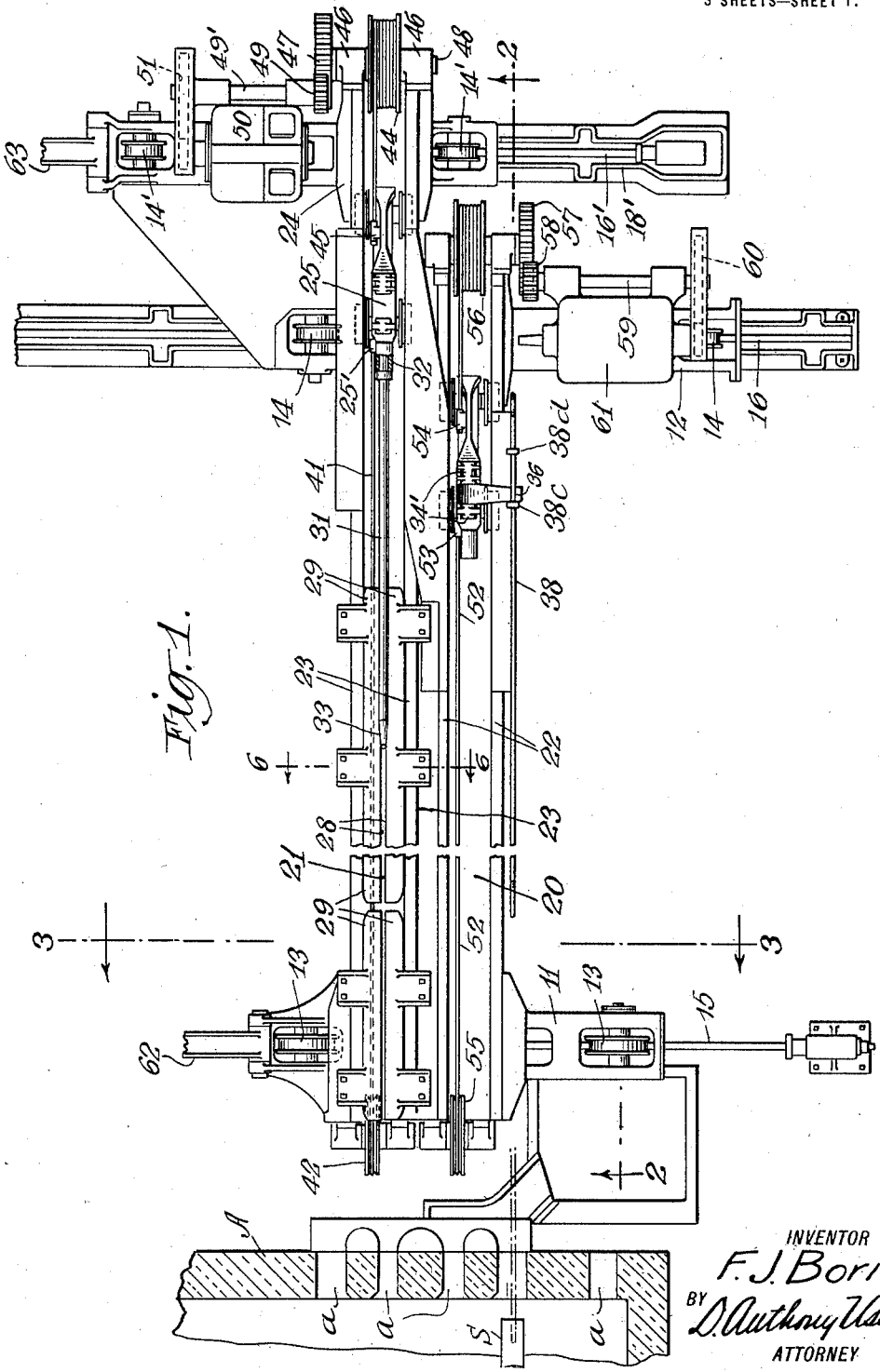
INVENTOR
F. J. Borie
BY
D. Anthony Usina
ATTORNEY F. J. BORIE.
MACHINE FOR FEEDING WORK INTO AND OUT OF WELDING FURNACES.
APPLICATION FILED DEC. 4, 1918.
1,372,594.
Patented Mar. 22, 1921.
3 SHEETS—SHEET 2.
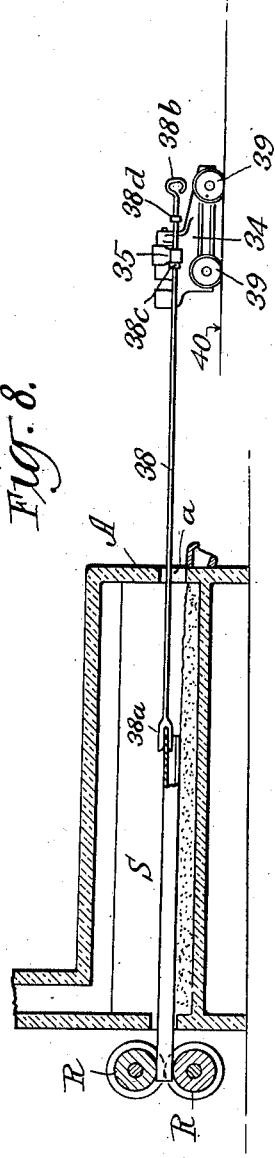
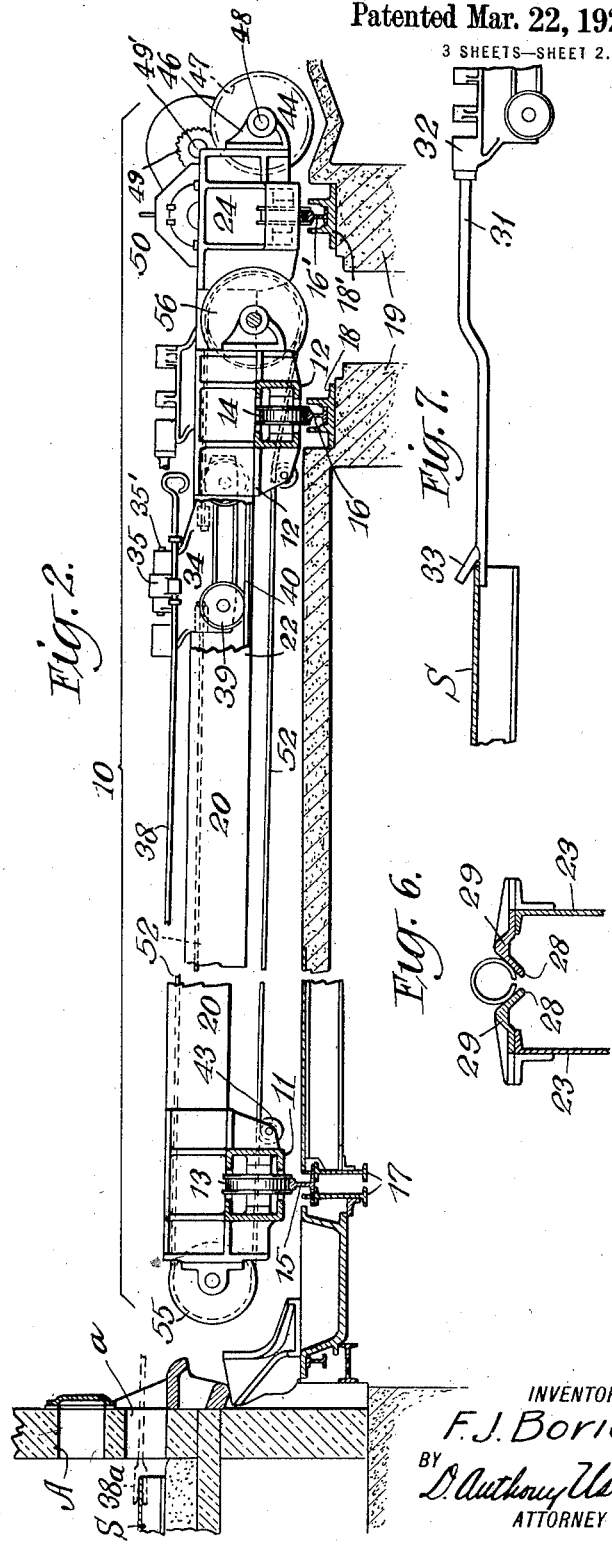
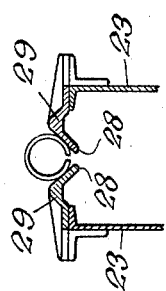
INVENTOR
F. J. Borie
BY
D. Anthony Usina
ATTORNEY F. J. BORIE.
MACHINE FOR FEEDING WORK INTO AND OUT OF WELDING FURNACES.
APPLICATION FILED DEC. 4, 1918.
1,372,594.
Patented Mar. 22, 1921.
3 SHEETS—SHEET 3.
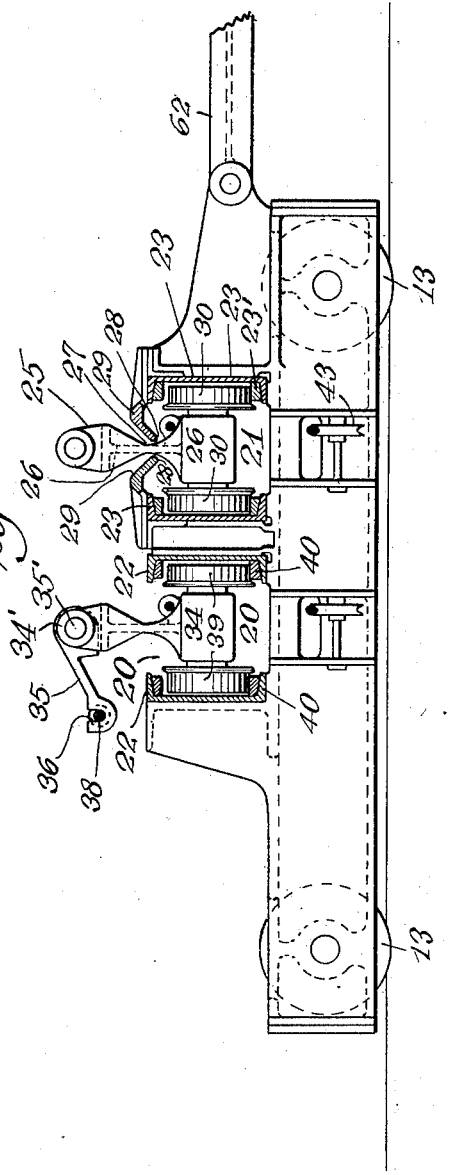
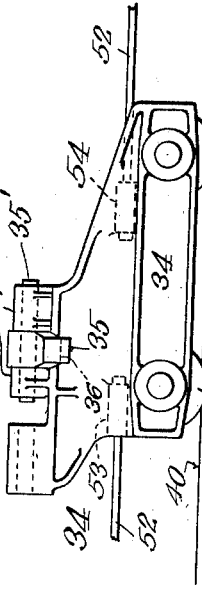
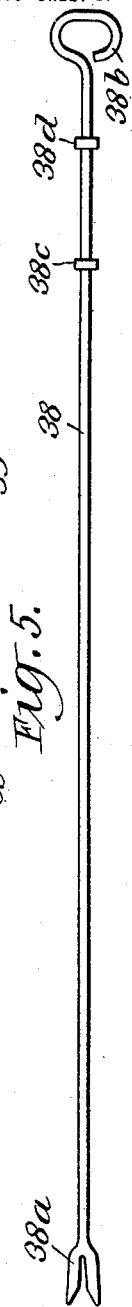
INVENTOR
F. J. Borie.
BY
ATTORNEY

UNITED STATES PATENT OFFICE.

FRANK J. BORIE, OF LORAIN, OHIO, ASSIGNOR TO NATIONAL TUBE COMPANY, A CORPORATION OF NEW JERSEY.

MACHINE FOR FEEDING WORK INTO AND OUT OF WELDING-FURNACES.

1,372,594.     Specification of Letters Patent.     Patented Mar. 22, 1921.

Application filed December 4, 1918. Serial No. 265,277.

*To all whom it may concern:*

Be it known that I, FRANK J. BORIE, a citizen of the United States, residing in Lorain, Lorain county, Ohio, have invented certain new and useful Improvements in Machines for Feeding Work Into and Out of Welding-Furnaces, of which the following is a specification.

This invention relates to an improved apparatus for feeding work into a heating furnace prior to its being subjected to pressure of welding rolls or other pressure exerting devices, and to means for pushing the work out of the welding furnace into engagement with the pressure exerting means.

The embodiment of the invention illustrated is particularly adapted for feeding bent skelp or partly formed pipe into and out of the welding furnace. Heretofore in handling pipe or skelp at the welding furnaces some of the operations have been performed manually, particularly the pushing of the heated skelp from the furnace into the bite of the pressure exerting means. In practice, experience has proven this to be a very inefficient and laborious way of handling the heated pipe and it has been difficult to find workmen who would continually work at this occupation.

By the utilization of the apparatus herein disclosed, the operator is not required to supply the driving force necessary to push the pipe from the furnace, nor is he required to approach to such close proximity to the hot furnace as was necessary with the means formerly provided for doing this work.

One of the objects of the invention is to provide an apparatus for pushing the work into the furnace. Another object is to provide a power driven mechanism for pushing the work out of the furnace and into engagement with the pressure exerting device for completing the welding. A further object is to mount the work feeding device and the push out mechanism on a structure which is movable transversely along the front of the furnace so that the work may be pushed into and out of the furnace at various locations thus permitting a number of pieces of work to be successively charged into the furnace at different transverse locations. A further object is to organize and coördinate the various elements described herein so as to effectively perform the functions set forth.

Other objects will be apparent from the following description and the claims.

Figure 1 is a plan view showing the general arrangement of my improved apparatus, a central portion of the pusher runways being broken away to permit of illustration on such a scale as to permit of a clear delineation of the various parts;

Fig. 2 is a vertical longitudinal section on the same scale of Fig. 1, substantially on the line 2—2 thereof;

Fig. 3 is an enlarged transverse section on the line 3—3 of Fig. 1, showing one of the supporting trucks of the carriage in elevation and the pusher runways in transverse section. For convenience of illustration the buggies which travel on the runways are assumed to be in their forward position and are therefore shown in this figure;

Fig. 4 is a detail side elevation of one of the pusher buggies;

Fig. 5 is an enlarged detail side view of the pusher bar which is adapted to be actuated by the buggy shown in Fig. 4;

Fig. 6 is a detail transverse section on the line 6—6 of Fig. 1, showing a piece of bent skelp supported in the work trough;

Fig. 7 is a detail view illustrating one of the pusher buggies with the picker arm thereof in engagement with a piece of bent skelp;

Fig. 8 is a diagrammatic view showing the push out buggy and pusher bar in the act of moving a piece of bent skelp into engagement with the welding pressure rolls.

Referring to Figs. 1 and 2, the structure illustrated consists of a carriage 10 comprising supporting trucks 11 and 12 which are provided with flanged wheels 13—13, 14—14 and 14'—14', which are arranged to ride on rails 15, 16 and 16' extending transversely in front of the welding furnace A. The track rail 15 is suitably supported on the girder 17 and the track rails 16 and 16' are supported on suitable bases 18 and 18' seated on the concrete footings 19—19 as shown in Fig. 2.

The carriage 10 includes runways 20 and 21 which runways comprise longitudinally extending channel bars 22—22 and 23—23. Near their front and rear ends, the channel bars 22—22 are secured in any suitable manner to the truck frames 11 and 12 respectively. The channel bars 23 of the runway 21 are also secured near their forward ends to the truck frame 11 and at their rear ends to the truck frame 12 and also to a supplemental supporting truck 24 which is supported on the wheels 14' above referred to. As thus constructed it is clear that the carriage 10 together with the runways 20 and 21 is movable as a unit transversely along the front face of the welding furnace A.

The runways 20 and 21 are each provided with a pusher buggy for feeding the skelp into and out of the welding furnace. These buggies are similar in construction and are arranged to be moved longitudinally along the runways as will now be described.

The buggy 25 herein termed the push-in buggy travels along the runway 21 on rails 23' secured to the flanges of the channels 23. This buggy consists of a frame 26 having a narrow neck 27 to permit its passage between the inner marginal edges 28—28 of the work supporting trough members 29—29 which are carried by the channel bars 23. Flanged wheels 30 are rotatably mounted on the frame of the buggy 25 and slidably support said buggy on the rails 23' of the runway 21. A picker arm 31 shown in Figs. 1 and 7 is supported in a socketed boss 32 of the push-in buggy and said picker arm 31 is provided with a forked end 33 for engagement with one end of the bent skelp or pipe.

The push-out buggy 34 is identical in construction with the push-in buggy above described except that it is provided with an arm 35 carried by a short bar 35' which is fixedly secured in upstanding bosses 34' formed on the push-out buggy 34 shown in Figs. 3 and 4. The arm 35 extends laterally from the buggy as shown in Figs. 1 and 3 and is slotted at 36 for the reception of the pusher bar 38.

The push-out buggy is provided with flanged wheels 39—39 adapted to travel on rails 40—40 which are secured to the flanges of the channel bars 22 of the runway 20.

In order to feed the bent skelp into the furnace the push-in buggy 25 is moved along the runway 21 by means of a cable 41, one end of which is secured to a boss 25' near the forward end of the buggy from which point it extends forwardly and passes over an idle sheave 42 mounted in suitable bearings secured to the forward truck 11. The slack side of the cable is supported in suitable guide sheaves 43 as shown in Figs. 2 and 3.

At the rear of the runway the cable passes several times around a driving drum 44, and the other end thereof is secured to a boss 45 near the rear of said push-in buggy. The drum 44 is mounted in bearings 46 secured to the truck 24. A gear 27 is secured to the shaft 48 on which the drum 44 is carried, said gear meshing with a pinion 49 which is secured to a shaft 49' driven by a motor 50 through the spur gearing 51 as shown in Fig. 1. The motor 50 is supported on the truck frame 24 and is therefore movable with the carriage 10.

The push-out buggy 34 is similarly propelled by a cable 52, the ends of which are secured to the bosses 53 and 54 formed on the buggy, the cable passing over a front idle sheave 55 and several times around the rear driving drum 56. The driving drum is driven by gears 57 and 58 and the shaft 59 which is in turn driven by the spur gearing 60 from the motor 61 mounted on the truck frame 12 of the carriage 10. The carriage 10 is provided with links 62 and 63 as shown in Fig. 1 which are connected to suitable means not shown for propelling the said carriage along the transversely extending rails 15, 16 and 16'.

In operation the bent skelp or pipe S is placed on the work trough 29 as shown in Fig. 6, and the carriage is then moved laterally to position the center line of the trough in alinement with one of the openings a of the furnace. The operator thereupon manipulates a suitable switch not shown to start the motor 50 which will cause the drum 44 to be rotated, thereby moving the push-in buggy 26 toward the furnace and causing the picker arm 31 to engage the skelp and shove it through the opening a into the welding furnace. After the skelp has been in the furnace a sufficient length of time to bring it up to a welding temperature the carriage 10 will be moved transversely to such a position that the push-out bar 38 will be lined up with the opening a whereupon the motor 61 will be started by the operator to cause the push-out buggy to bring the forked end 38ª of the pusher bar 38 into juxtaposition with the heated skelp. The operator by manipulating the handle 38ᵇ can then teeter the bar on the arm 35 and shove the forked end 38ª into engagement with the skelp S whereupon a continued movement of the buggy 34 will, by coaction of the collar 38ᶜ of the pusher bar and the arm 35 carried by the buggy, cause the skelp to be pushed out of the furnace and into engagement with the pressure exerting welding rolls R as shown in Fig. 8. After the skelp has been pushed out a sufficient distance the motor is reversed to withdraw the pusher bar and at this time the collar 38ᵈ coacts with the arm 35 on the buggy in its rearward travel.

From the foregoing description it is clear that with my improved apparatus the work may be readily brought into alinement with different openings in the furnace and thereby permit of successively feeding different pieces of work thereto. After the various pieces have reached the required temperature, the carriage 10 will be moved transversely across the face of the furnace bringing the push-out bar into alinement with the work whereupon the motor 61 may be operated to cause the buggy 34 and 38 to push the skelp into engagement with the welding rolls.

In some instances it may be practical to mount the arm 35 for manipulating the pusher bar directly on the same buggy to which the picker arm is carried. However, experience teaches that such an arrangement is rather inefficient as the runway is of such great length that considerable time is lost in moving the buggy back and forth to bring it in proper position, first for engagement of the picker bar with the work to be pushed in and later in position to line the push-out bar with the work in the furnace. Whereas with the arrangement shown the buggies being driven independently of one another, one may be doing its work while the other is being brought into position to subsequently be brought into play. It is also clear that in some instances both buggies may be simultaneously operated thereby effecting a great saving of time and materially increasing the output of the furnace.

Though I have described with great particularity of detail the embodiment of the invention, it is to be understood that changes may be made by those skilled in the art without departing from the spirit and scope of the invention as defined in the following claims.

What I claim is:—

1. In apparatus of the class described, a welding furnace, a carriage movable relatively thereto, runways supported by said carriage and a buggy arranged to travel on each runway independent of each other, one of said buggies being adapted to push work into said furnace, and the other buggy being adapted to push work out of said furnace.

2. In apparatus of the class described, a welding furnace, a carriage movable relatively thereto, runways supported by said carriage, a buggy movable along each runway for pushing the work into and out of the furnace, and means supported by the carriage for independently propelling each of said buggies.

3. In apparatus of the class described, a carriage mounted for transverse movement along the front of a welding furnace, a pair of buggies movable relatively to said carriage in a direction substantially at right angles to the direction of travel of said carriage, one of said buggies having means for feeding the work into a welding furnace, and the other buggy having means for pushing the work out of the furnace, and means for independently propelling said buggies.

4. In apparatus of the class described, a carriage movable along one face of a welding furnace, two runways supported by said carriage, a work supporting trough carried by one of said runways, a buggy movable along each runway substantially at right angles to the direction of travel of said carriage for manipulating the work, means carried by one of said buggies for feeding the work into the welding furnace, and means actuated by the other buggy for pushing the work out of the furnace.

5. The combination with a furnace for heating skelp, and welding means arranged at one side of said furnace, of a carriage arranged at the other side of and movable relatively to said furnace, a pair of runways supported on said carriage and extending substantially at right angles to the direction of travel of said carriage, a buggy movable along each runway, means for moving said buggies independently of each other, one of said buggies having means for feeding the skelp into the furnace, and the other of said buggies having means for pushing the heated skelp out of the furnace into engagement with the said pressure exerting means.

6. In apparatus of the class described, a welding furnace, a carriage movable relatively thereto, parallel runways supported by said carriage, a work supporting trough arranged above one of said runways having a longitudinal slot therein, a buggy movable along each runway for pushing work into and out of the furnace, and means supported by said carriage for independently propelling said buggies along their respective runways.

7. In apparatus of the class described, a welding furnace, a carriage movable relatively thereto, runways supported by said carriage, a work supporting trough arranged above one of said runways, said trough being made in section and the sections being arranged to form a longitudinal slot therein, a buggy movable along each runway, the framework on one of said buggies being arranged to extend upwardly through the longitudinal slot in said trough, and means for independently actuating the buggies in moving work into and out of the furnace.

8. In apparatus of the class described, a welding furnace, a carriage movable relatively thereto, runways supported by said carriage, a work supporting trough arranged above one of said runways, said trough having a longitudinal slot in the bottom thereof, a buggy movable along each runway, the buggy on said runway immediately below said trough having a neck portion extending up through the slot in said trough, a boss formed on said projecting neck of said buggy adapted to support a picker arm, the other of said buggies having an arm extending outwardly to one side thereof adapted to receive and loosely hold a pusher rod.

9. In apparatus of the class described, a welding furnace, a carriage movable relatively thereto, runways supported by said carriage, a work supporting trough arranged above one of said runways, said trough having a longitudinal slot in the bottom thereof, a buggy movable along each runway, the buggy on said runway immediately below said trough having a neck portion extending up through the slot in said trough, a boss formed on said projecting neck of said buggy adapted to support a picker arm, the other of said buggies having an arm extending outwardly to one side thereof adapted to receive and loosely hold a pusher rod, and means for independently propelling said buggies along their respective runways.

In witness whereof, I have hereunto signed my name.

FRANK J. BORIE.